United States Patent
Kanso et al.

(10) Patent No.: US 12,124,924 B2
(45) Date of Patent: Oct. 22, 2024

(54) MACHINE-LEARNING MODEL TO PREDICT PROBABILITY OF SUCCESS OF AN OPERATOR IN A PAAS CLOUD ENVIRONMENT

(71) Applicant: International Business Machines Corporation, Armonk, NY (US)

(72) Inventors: Ali Kanso, Stamford, CT (US); Jinho Hwang, Ossining, NY (US); Muhammed Fatih Bulut, West Greenwich, RI (US); Shripad Nadgowda, Elmsford, NY (US); Chen Lin, Elmsford, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 647 days.

(21) Appl. No.: 16/950,228

(22) Filed: Nov. 17, 2020

(65) Prior Publication Data
US 2022/0156631 A1     May 19, 2022

(51) Int. Cl.
*G06N 20/00*     (2019.01)
*G06F 8/60*     (2018.01)
(Continued)

(52) U.S. Cl.
CPC ............... *G06N 20/00* (2019.01); *G06F 8/60* (2013.01); *G06F 8/61* (2013.01); *G06N 7/01* (2023.01); *H04L 41/50* (2013.01)

(58) Field of Classification Search
None
See application file for complete search history.

(56) References Cited

U.S. PATENT DOCUMENTS 8,826,277 B2 * 9/2014 Chang ................... G06F 9/5072
718/1
9,734,458 B2 * 8/2017 Kupershtok .............. G06F 8/70
(Continued)

FOREIGN PATENT DOCUMENTS

CN     110427275 A     11/2019

OTHER PUBLICATIONS

International Search Report and Written Opinion received for PCT Application Serial No. PCT/CN2021/128431 dated Jan. 28, 2022, 9 pages.
(Continued)

*Primary Examiner* — Van H Nguyen
(74) *Attorney, Agent, or Firm* — Amin, Turocy & Watson, LLP

(57) ABSTRACT

Systems and methods are provided that integrate a machine-learning model, and more specifically, utilizing a platform as a service (PaaS) cloud to predict probability of success for an operator in an environment. An embodiment comprises a system having: a processor that executes computer executable components stored in memory, trained machine-learning model that predicts probability of success for deployment of an operator in an environment with a namespace of a platform as a service (PaaS) cloud, and a deployment component that receives a first operator and a first namespace and employs the trained machine-learning model to predict success of deployment of the first operator in a first environment.

20 Claims, 9 Drawing Sheets

(51) Int. Cl.
*G06F 8/61* (2018.01)
*G06N 7/01* (2023.01)
*H04L 41/50* (2022.01)

(56) References Cited

U.S. PATENT DOCUMENTS

| | | | |
|---|---|---|---|
| 9,825,881 | B2 | 11/2017 | Johnston et al. |
| 10,684,940 | B1 | 6/2020 | Kayal et al. |
| 10,796,023 | B2* | 10/2020 | Levin .................... G06T 7/0002 |
| 10,803,392 | B1 | 10/2020 | Khan et al. |
| 10,853,116 | B2* | 12/2020 | Cui ..................... G06F 11/3419 |
| 11,036,483 | B2* | 6/2021 | Veljanoski ............... G06F 8/71 |
| 11,138,168 | B2* | 10/2021 | Purushothaman .. H04L 43/0823 |
| 11,468,379 | B2* | 10/2022 | Bailey ...................... G06N 5/01 |
| 2013/0139152 | A1* | 5/2013 | Chang ................ G06F 9/45545 |
| | | | 718/1 |
| 2017/0228248 | A1 | 8/2017 | Bala et al. |
| 2018/0285750 | A1* | 10/2018 | Purushothaman ..... G06N 5/045 |
| 2020/0082270 | A1 | 3/2020 | Gu et al. |
| 2020/0099592 | A1 | 3/2020 | Mahindru et al. |
| 2020/0145299 | A1 | 5/2020 | Do et al. |
| 2021/0004712 | A1* | 1/2021 | Sarferaz .................... G06F 9/54 |

OTHER PUBLICATIONS

Alon et al., "The neural network architecture of code2vec". Source: code2vec: Learning Distributed Representations of Code by 2018, 29 pages.

Alyas "Cloud Evolution Management using Intelligent Cloud Ecosystem (ICE)," Dissertation, National College of Business Administration and Economics, Lahore, Feb. 2018, 90 pages.

Anonymous "System and Method to Optimize Multicloud Resources and Policy Preparations," IPCOM000263144D, Ip.com, Aug. 2, 2020, 5 pages.

* cited by examiner

MACHINE-LEARNING MODEL TO PREDICT PROBABILITY OF SUCCESS OF AN OPERATOR IN A PAAS CLOUD ENVIRONMENT

TECHNICAL FIELD

The subject disclosure relates to a machine-learning model, and more specifically to utilizing a platform as a service cloud to predict probability of success for an operator in an environment.

BACKGROUND

A machine-learning algorithm is a process that adapts a model to data with an objective. An algorithm generally specifies a method that transforms data from an input to output and learns appropriate mapping from input and output values. Thus, a machine-learning algorithm is a combination of the model and type of algorithm chosen. A model is further detailed with specifications of mapping functions and stores parameter data while continuing to learn algorithm updates towards satisfying an overall objective. Machine-learning has attracted increasing attention from commercial entities and researchers. Existing approaches primarily focus on tackling hard computational issues of effectively determining suitable combinations of analytic algorithms. Modern advances in software engineering have led to deploying software as services (known as SaaS), which provides significant advantage for organizations to focus on core businesses instead of expanding resources on computer infrastructure and maintenance. In particular, use of operators has been gaining popularity in a Platform as a Service (PaaS) cloud such as Kubernetes (K8s) and OpenShift®. Operators (e.g., construct(s) defined within programing languages that behave generally like functions, but which differ syntactically or semantically) are used for automating operations in PaaS. Isolated entities such as namespaces in K8s or projects in OpenShift® can have respective configurations that can have different implications for operator functionalities. Operators being blocked or that fail to operate can have significant impact on life cycle of information technology (IT) management in Kubernetes (K8s). As a prerequisite, operators typically rely on permission to create resources; however, having permissions is often insufficient to execute successful operation thereof.

Conventional methods and systems to deploy applications on one or more cloud systems based on requirements and available resources often utilize snapshots to reduce risk in a migration process of virtualized settings. However, conventional techniques do not adequately account for risk associated with deployment of operators in new environments.

SUMMARY

The following presents a summary to provide a basic understanding of one or more embodiments of the invention. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that relates to a machine-learning model, and more specifically to utilizing a platform as a service (PaaS) cloud to predict probability of success for an operator in an environment.

Embodiments focus on deployment of operators in a PaaS cloud environment, and employ methodologies to predict success of operator deployment by utilizing machine-learning. Lastly, code to vector methodology allows to convert code to a vector format that can be incorporated in machine-learning applications. Embodiments transform code to vector representations, and utilize the code to vector methodology to predict operator success in an environment with configurations that are written as codes.

In accordance with an embodiment, a system, comprises a processor that executes components stored in memory, a machine-learning model that predicts probability of success for deployment of an operator in an environment with a namespace of a platform as a service (PaaS) cloud; and a deployment component that receives a first operator and a first namespace and employs the machine-learning model to predict success of deployment of the first operator in a first environment.

In an optional aspect, a training component trains the machine-learning model with capabilities of the first operator and a set of configurations that apply to the first namespace.

In an optional aspect, a training component employs as input different configurations that apply to the first namespace where the first operator can be deployed.

In an optional aspect, a training component employs an output of deployment of the first operator to other namespaces in the PaaS cloud.

In accordance with an embodiment, comprises predicting, using a machine-learning model, probability of success for deployment of an operator in an environment with a namespace of a platform as a service (PaaS) cloud; and receiving, using a deployment component, a first operator and a first namespace and employing the machine-learning model to predict success of deployment of the first operator in a first environment.

In an optional aspect, the method further comprises training the machine-learning model with capabilities of the first operator, and a set of configurations that apply to the first namespace.

DETAILED DESCRIPTION

Figure 1:
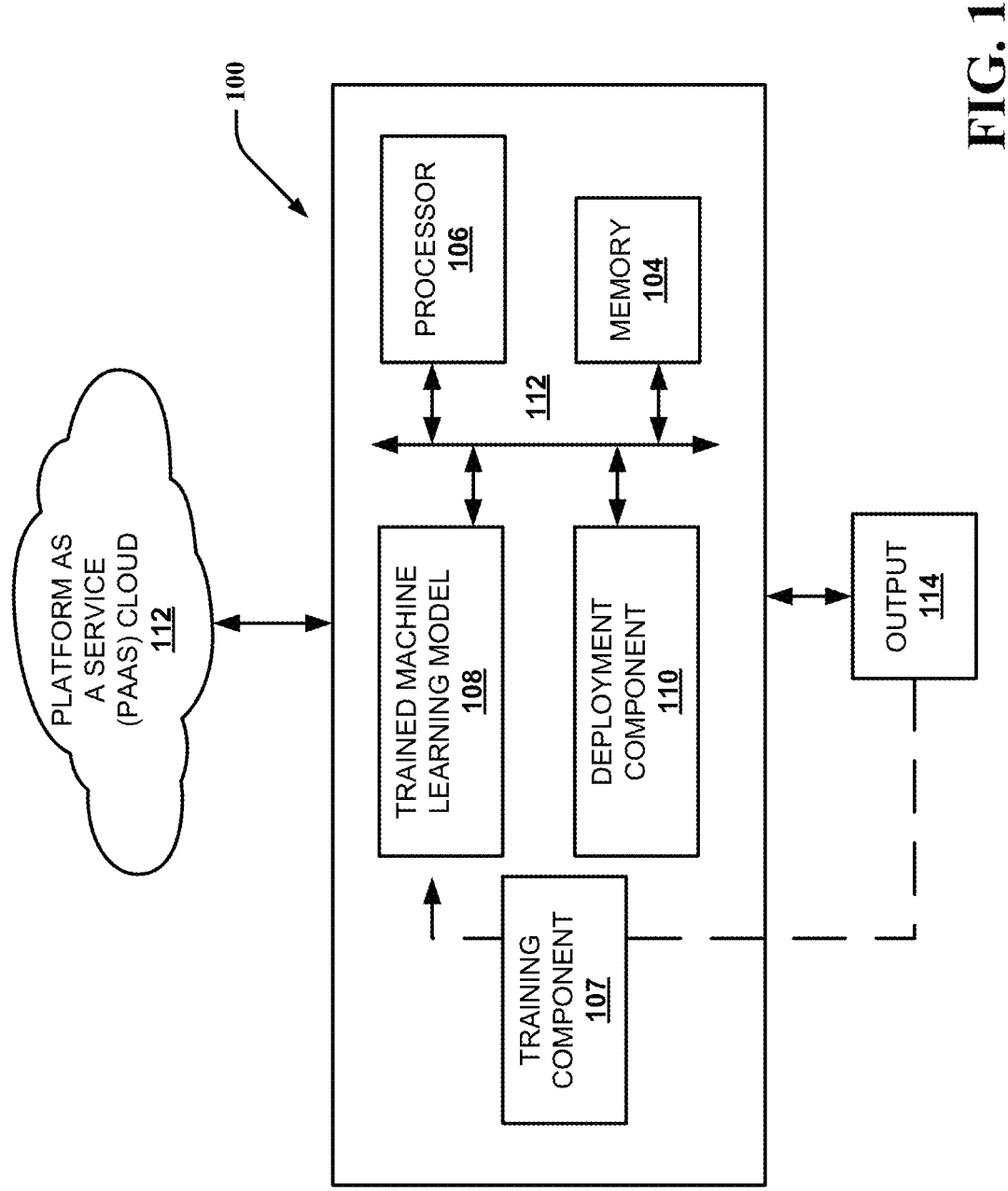
FIG. 1 illustrates a block diagram of an example system implementation that implements a system to predict the probability of success for an operator in a new environment in Platform as a Service cloud.

The following detailed description is merely illustrative and is not intended to limit embodiments and/or application or uses of embodiments. Furthermore, there is no intention to be bound by any expressed or implied information presented in the preceding Summary section, or in the Detailed Description section. One or more embodiments are now described with reference to the drawings, wherein like reference numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

Embodiments relate to deployment of operators in a PaaS cloud environment and employ methodologies to predict success of operator deployment by utilizing machine-learning. Code to vector methodology facilitates converting code to a vector format that can be incorporated in machine-learning applications. Embodiments transform code to vector representations, and utilize the code to vector methodology to predict operator success in an environment with configurations that are written as codes. It is to be appreciated that although example embodiments are described herein within a Kubernetes (K8s) framework, innovations described and claimed herein are applicable to any suitable container-orchestration system for automating computer application deployment, scaling, and management, e.g., for containerized workloads and services that facilitate both declarative configuration and automation.

The subject disclosure relates generally to embodiments that predict probability of success for an operator in a new environment of a Platform as a Service (PaaS) cloud. This includes receiving capabilities of the operator as input and receiving different configurations that apply to a given namespace where the operator can be deployed. Output of deployment of the operator to other namespaces is received; given the input and output, a machine-learning model is trained to predict probability of success of deployment of the operator in the new PaaS environment.

In today's digital world, data plays a prime factor in many applications. Action(s) taken by a user can often leave a digital footprint through satellite images, bio-medical fields, smartphones, social media, and other applications. Rapidly growing technology has led to an exponential increase in machine-generated data. Big Data represents a new era in data exploration and utilization such that it consists of data that is high in volume, variety, and velocity. Modern advances in software engineering have led to deploying software as services (known as SaaS), which provides a significant advantage for organizations to focus on core businesses instead of expanding resources on computer infrastructure and maintenance. For example, a 'big-data' software as a service, which takes a set of data instances as input, performs computations for data clustering, and returns partitioning of the data to a client as an output. Big data can be used in many scenarios for data mining such as, to track user-generated content in social media, analyze web page images from the web and census data, and obtain required data from the Internet of Things (IoT) sensors, activity tracking from smartphones and network traffic data for cyber-security. Machine-learning has become an integral part of the big data world.

Machine-learning has attracted increasing attention from commercial entities and researches. Existing approaches primarily focus on tackling hard computational issues of effectively determining suitable combinations of analytic algorithms. For example, feature engineering, selection, and tuning hyper parameters. New emerging technologies enhance the concept of machine-learning algorithms from pattern recognition to performing specific tasks. Machine-learning becomes a significant iterative aspect in a digital world as models are exposed to new data. Machine-learning is consequently able to adapt independently as well. Thus, the concept of learning from previous computations and an ability to produce reliable decisions gain fresh momentum. Recent studies have shown that many machine-learning systems can automatically apply complex mathematical calculations to big data at a faster rate than conventional systems. Some examples of machine-learning applications are self-driving cars, online recommendation offers, and fraud detection. Most industries that work with substantial data recognize importance of machine-learning technology.

As data grows in volume and variety, computational processing that is powerful and affordable is of growing importance as well. Through machine-learning systems, data can automatically produce models to analyze complex data and deliver accurate analytical results. This would ultimately assist many organizations to identify profitable opportunities while avoiding unknown risks. In particular, an operator can provide a machine-learning algorithm with a known dataset that includes desired inputs and outputs, and the algorithm can determine how to arrive at those inputs and outputs. Use of operators has been gaining popularity in the Platform as a Service (PaaS) cloud such as K8s and OpenShift®. Operators are used to automate operations in PaaS such as for example deploying an application on demand where the operators are employed to facilitate installing an application into a PaaS cloud. Other examples for use of operators include compliance checks to ensure if a cluster has valid compliance configurations, generating and restoring backups of applications state, handling upgrades of application code alongside related changes such as database schemas or extra configuration settings, publishing service to applications that do not support cloud environment APIs such as Kubernetes (K8s) to discover and simulate failure in a cluster to test resilience. An operator is code that has gained popularity as a result of PaaS and OpenShift® tools. The technical name for isolated entities in a cloud environment (e.g., such as Kubernets (K8s)) is known as namespace, and isolated entities do not have visibility to one another.

Isolated entities such as namespaces in Kubernetes (K8s) and projects in OpenShift® can have respective configurations that can have implications for operator functionalities. An application deployed within a namespace is typically subject to a network policy defined for that namespace. For example, if a namespace has a network policy that determines that incoming requests cannot be accepted from the internet wherein ingress is prohibited, then the deployed application in that namespace cannot take a request from the internet. However, the operator can access requests within the namespace based on the network policy. There are other examples of areas that operators can access requests such as network policies, role-based access control (RBAC), admission controllers, and resource quota limits. Operators being blocked or that fail to operate can have significant impact on life cycle of IT management in cloud environment such as Kubernetes; understanding risk associated with operator performance can facilitate mitigating risk associated with deployment thereof. As a prerequisite, operators need permission to create resources such as pods (a smallest execution unit in Kubernetes). Pods are ephemeral by nature, if a pod (or a node it executes on) fails, Kubernetes can automatically create a new replica of that pod to continue operations. However, having permission is not enough as a pod can be blocked by an admission controller, pod traffic can be blocked by network policies, pod can remain pending because of scheduling and the pod may be blocked by role-based access control (RBAC) from accessing K8s. Based on configuration in a namespace, operators can have success in tasked jobs or can fail. Before deployment, it is desirable to know if deployment will be successful or fail. Understanding risk of an operation can assist an operation engineer to make informed decisions about execution. Operators are akin to intelligent agents that can automate actions. Thus, embodiments herein propose an efficient system, using a machine-learning model, to predict probability of success for an operator in a new environment in a Platform as a Service (PaaS) cloud. A machine-learning model is trained given inputs and output. An operator is input with a description of an operation along with other artifacts such as operator controller custom resource definition (CRD). A CRD is an object that extends the Kubernetes APIs into a cluster. A namespace is associated with different configurations where the operator can be deployed. A retrieved output facilitates determining whether deployment of the operator in a particular namespace will be successful or not.

FIG. 1 illustrates a block diagram of an example, non-limiting system 100 that can access data and process that data using variable computing components depicted in accordance with one or more embodiments described herein. System 100 can comprise a memory 104, a processor 106, a training component 107, a trained machine-learning model 108, a deployment component 110, and/or a bus 112.

It should be appreciated that embodiments of the subject disclosure depicted in various figures disclosed herein are for illustration only, and as such, the architecture of such embodiments are not limited to the systems, devices, and/or components depicted therein. For example, in some embodiments, system 100 can further comprise various computer and/or computing-based elements described herein with reference to operating environment 700 and FIG. 7. In several embodiments, such computer and/or computing-based elements can be used in connection with implementing one or more of the systems, devices, components, and/or computer-implemented operations shown and described in connection with FIG. 1 or other figures disclosed herein.

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to trained machine-learning model 108, deployment component 110, and/or another component associated with the system 100 as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 716 and FIG. 7. Such examples of memory 104 can be employed to implement any embodiments of the subject disclosure.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 714 and FIG. 7. Such examples of processor 106 can be employed to implement any embodiments of the subject disclosure.

System 100, memory 104, processor 106, trained machine-learning model 108, deployment component 110, and/or another component of system 102 as described herein can be communicatively, electrically, operatively, and/or optically coupled to one another via a bus 112 to perform functions of system 100 and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 718 and FIG. 7. Such examples of bus 112 can be employed to implement any embodiments of the subject disclosure.

System 100 can comprise any type of component, machine, device, facility, apparatus, and/or instrument that comprises a processor and/or can be capable of effective and/or operative communication with a wired and/or wireless network. All such embodiments are envisioned. For example, system 100 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

System 100 can be coupled (e.g., communicatively, electrically, operatively, optically, etc.) to one or more external systems, sources, and/or devices (e.g., classical and/or quantum computing devices, communication devices, etc.) using a wire and/or a cable. For example, system 100 can be coupled (e.g., communicatively, electrically, operatively, optically, etc.) to one or more external systems, sources, and/or devices (e.g., classical and/or quantum computing devices, communication devices, etc.) using a data cable including, but not limited to, a High-Definition Multimedia Interface (HDMI) cable, a recommended standard (RS) 232 cable, an Ethernet cable, and/or another data cable.

In some embodiments, system 100 can be coupled (e.g., communicatively, electrically, operatively, optically, etc.) to one or more external systems, sources, and/or devices (e.g., classical and/or quantum computing devices, communication devices, etc.) via a network. For example, such a network can comprise wired and/or wireless networks, including, but not limited to, a cellular network, a wide area network (WAN) (e.g., the Internet) or a local area network (LAN). System 100 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, vulnerability and attack technique association system 102 can comprise hardware (e.g., a central processing unit (CPU), a transceiver, a decoder, quantum hardware, a quantum processor, etc.), software (e.g., a set of threads, a set of processes, software in execution, quantum pulse schedule, quantum circuit, quantum gates, etc.) or a combination of hardware and software that can facilitate communicating information between vulnerability and attack technique association system 102 and external systems, sources, and/or devices (e.g., computing devices, communication devices, etc.).

In some embodiments, the training component 107 can train and develop trained machine-learning model 108 that can employ one or more machine-learning (ML) and/or artificial intelligence (AI) models that are based on and/or can perform natural language processing (NLP) using a similarity learning process and/or a similarity search process to define the above described mappings. For example, such one or more ML and/or AI models can include, but are not limited to, a pretrained language representation model (e.g., transformer based) with fine-tuning (e.g., a bidirectional encoder representations from transformers (BERT) model), a long short-term memory (LSTM) model, a bidirectional LSTM model with a conditional random field (CRF) layer (abbreviated as BiLSTM-CRF), a shallow or deep neural network model, a convolutional neural network (CNN) model, a decision tree classifier, and/or any supervised or unsupervised ML and/or AI model that can perform natural language processing (NLP) using a similarity learning process and/or a similarity search process to define the above described mappings.

The system 100 can facilitate a process of assessing and identifying large amounts of various forms of data, using machine-learning, and training a neural network or other type of model. The system 100 can also generate predictive recommendations to an individual level with context in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform operations described herein. Repetitive description of like elements employed in one or more embodiments described herein is omitted for sake of brevity.

The system 100 facilitates the training component 107, the training machine-learning model 108 utilizing a platform as a service cloud 116 to predict probability of success for an operator in a new environment. Benefits can be achieved including, but not limited to, receiving a new operator and a namespace to be deployed as an input, and using the trained machine-learning model 108 to predict probability of success of deployment of the operator in the new environment.

The system 100 can facilitate a process of assessing and identifying a large amount of various forms of data. The system 100 can also generate predictive recommendations to an individual level resulting in a context in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

System 100 can optionally include a server device (not shown), one or more networks and one or more devices (not shown). The system 100 can also include or otherwise be associated with a Platform as a Service (PaaS) cloud 116 which comprises the trained machine-learning model 108 where operator and namespace are used as input. Deployment component 110 deploys the input based on configuration and training data and produces an output 114 that is used to predict probability of success of deployment of the operator in a particular environment associated with the namespace.

In an implementation, the trained machine-learning model 108 predicts probability of success for the operator in an environment with a namespace of the platform as a service (PaaS) cloud 116. The deployment component 110 receives a first operator and a first namespace to be deployed in the first environment of the PaaS cloud 116, and employs the trained machine-learning model 108 to predict success of the deployment of the first operator in the first environment. Given the inputs and outputs, the trained machine-learning model 108 predicts probability of deployment success and employs different configurations that apply to the namespace where the operator is intended to be deployed. The output 114 of deployment can be a success or a failure. The training component 107 can train the model 108 to learn from the output data 114 and from previous histories of operator deployments in a differently configured environment to predict success, using machine-learning, of the intended operator deployment.

System 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the systems 100 and/or any other suitable device that can employ information provided by system 100. It is to be appreciated that systems 100, components, models or devices can be equipped with communication components (not shown) that enable communication between the system, components, models, devices, etc. over one or more networks.

The various components of systems 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It may be appreciated that such systems and components can include these components or sub-components specified therein, some of the specified components or sub-components, and/or additional components. Sub-components may also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

The subject computer processing systems, methods apparatuses and/or computer program products can be employed to solve operator deployment related problems that arise through advancements in technology, computer networks, the Internet and the like.

In today's digital world, use of operators has been gaining popularity in the Platform as a Service (PaaS) cloud platform. In particular, operators being blocked or failed to operate can have a significant impact on the life cycle of IT management in Kubernetes. Thus, understanding risk of operators can facilitate mitigating risk associated with deployment thereof. Embodiments can determine probability of operator deployment success or not. The probably of success for an operator in a PaaS environment can be determined by training and operation components. In the training component, a namespace is chosen to deploy the operator. The input operator includes description (e.g., taking and restoring backup of application state), and other artifacts such as operators Custom Resource Definition (CRD) (e.g., where the operator is to be deployed, how the operator may operate, a .yaml file and code (logic)). Different configurations such as network policies, RBAC, admission controllers, and resource limits are applied to a given namespace where an operator can be deployed. Upon deployment, an output received can determine if the operator deployment will be successful or not. In continuous operation, a new operator and a namespace are received to be deployed as input and using the trained machine-learning model 108, probability of success of operator deployment can be predicted. This efficient methodology facilitates mitigating risk of disrupting business operations and cost, reduces time of changes to deploy operators by analyzing success beforehand, and efficiently scale operator deployment to other environments through increased confidence that operator deployment in a particular environment has probability (e.g., within acceptable range) of success or not.

Figure 2:
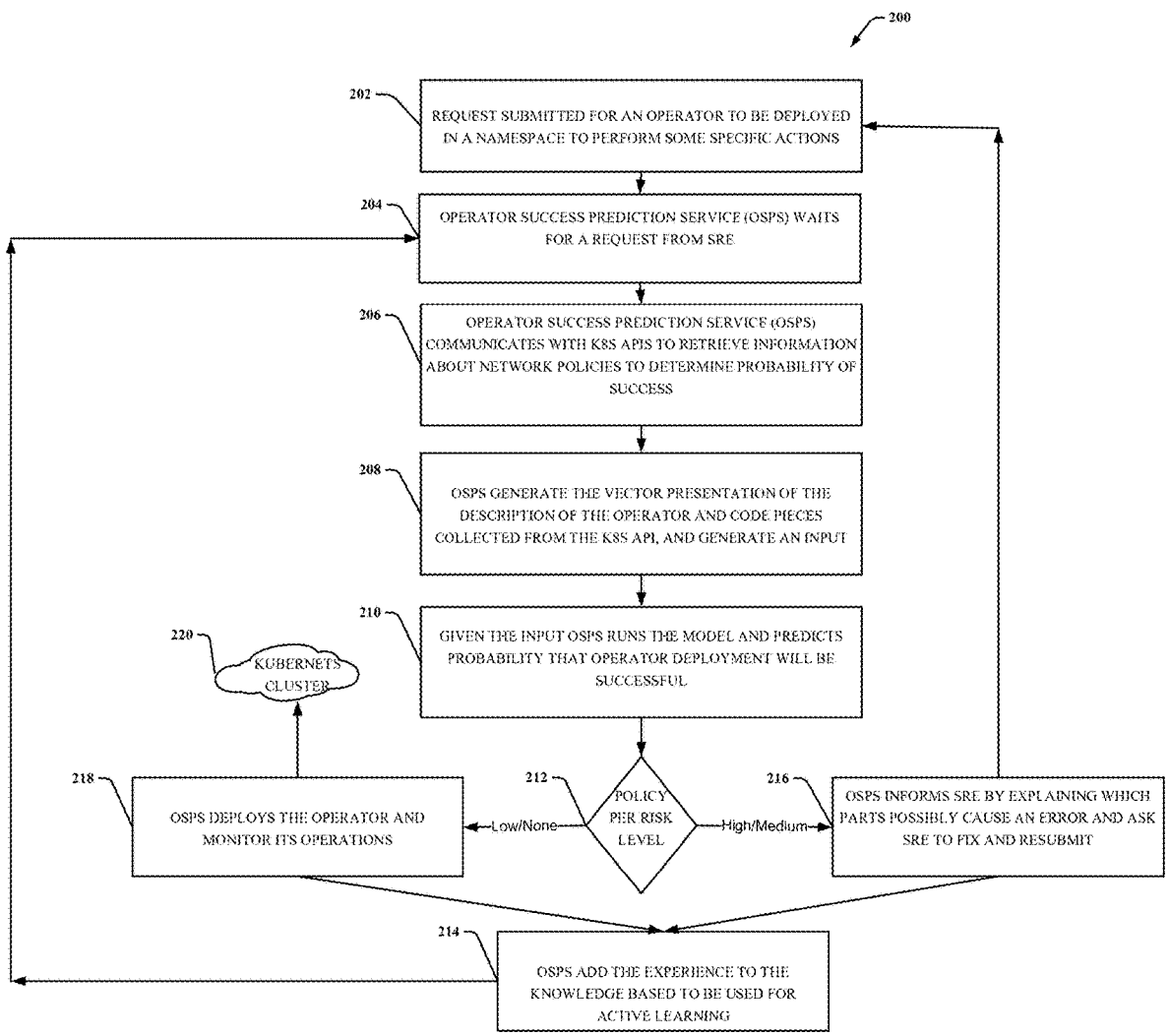
FIG. 2 illustrates an example flowchart of an integrated system to predict the probability of success for an operator in a new environment in Platform as a Service cloud.

FIG. 2 illustrates an example flowchart 200 of an integrated system to predict probability of success for an operator in a new environment in Platform as a Service cloud. At 202, a request is submitted (e.g., by a software reliability engineer (SRE)) for an operator to be deployed in a namespace to perform some specific actions. An Operator Success Prediction Service (OSPS) can communicate, for example, with Kubernetes (K8s) APIs to retrieve information about network policies and other artifacts to determine probability of success of operator deployment. In these embodiments, an OSPS at 204 waits for a request, e.g., from the engineer (SRE). At 206, the OSPS communicates with the new environment, e.g., through K8 application programming interfaces (APIs) to retrieve information regarding network policies associated with the new environment. At 208, the OSPS can generate a vector representation of description of the operator and code pieces collected from the Kubernetes (K8s) API and generate an input. At 210, given the input, the OSPS runs the machine learning model and predicts probability of success of the deployment. The machine learning model can output for example a probability rate between 0 and 1 regarding potential success rate of operator deployment in the new environment. At 212, risk levels are categorized as high/medium/low/none based on a probability determined by the OSPS. If policy per risk level is low or none then the OSPS deploys the operator and monitors its operations at 218 in a Kubernetes (K8s) cluster 220. A Kubernetes (K8s) cluster is a set of node machines for running containerized applications. If the policy per risk level at 212 is high or medium, at 216, the OSPS informs the SRE by identifying which parts possibly could cause an error and request the SRE to address and resubmit. The process proceeds back to 202 where the SRE can submit a request for an operator to be deployed in a namespace to perform some specific actions whether the risk level is success or failure, and the OSPS can add such experience to a knowledge base to be employed in connection with active learning at 214. The process can repeat from 204 wherein the OSPS waits for another request from the SRE. Based on the high/medium/low/none risk level categorization; the policy defines the action on whether to deploy or return back to SRE. Through this continual (or iterative) operation, prior histories of operator deployment can be utilized in various configured environments to predict success of operator deployment using machine-learning. Active learning can be performed continually to train and develop a machine-learning model based on new deployments of operators in different environments.

Figure 3:
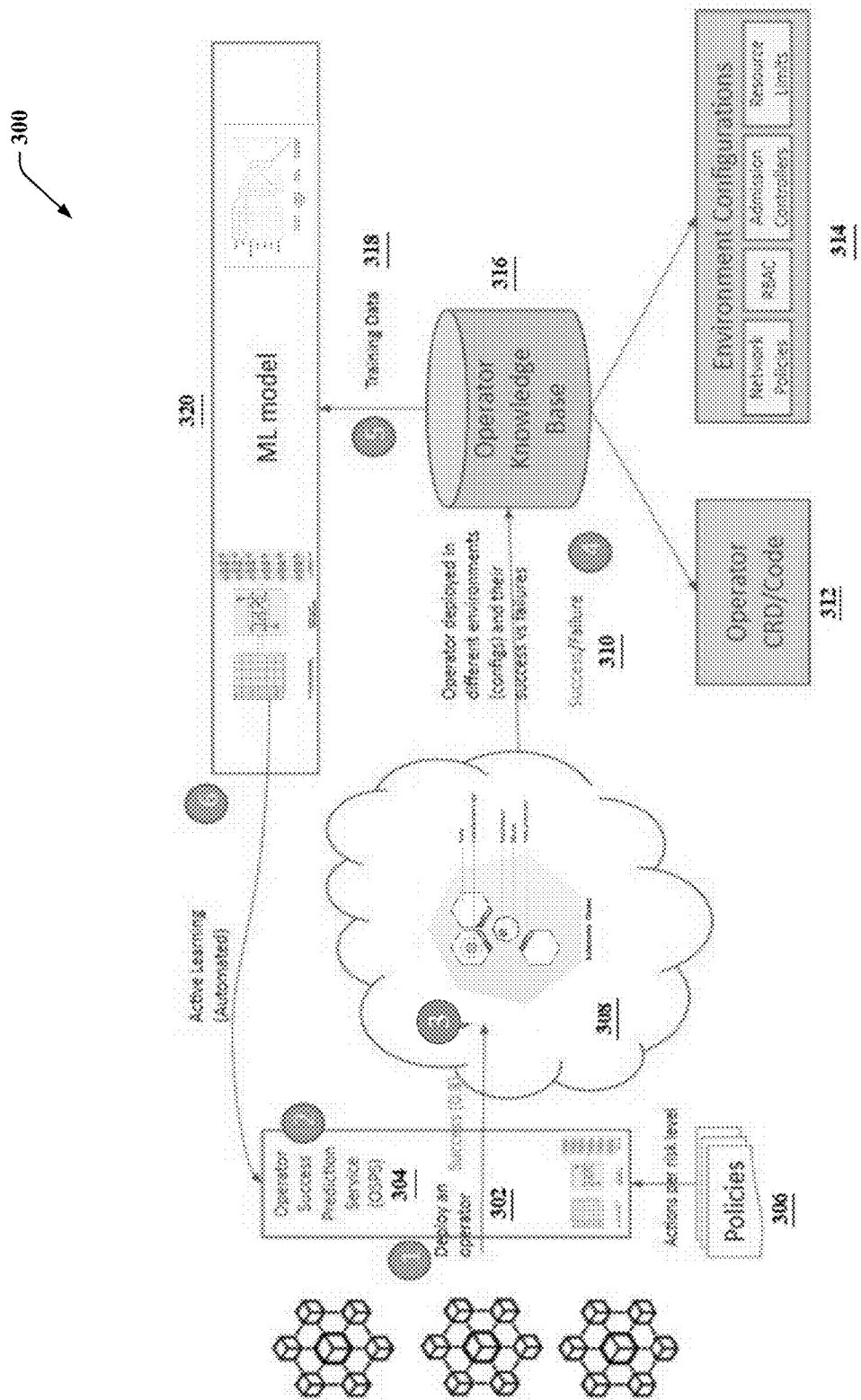
FIG. 3 illustrates an example architecture of predicting operator success based on environment similarity analysis.

FIG. 3 illustrates an example architecture 300 that facilitates predicting operator success based on environment similarity analysis. The architecture 300 can facilitate determining likelihood that the operator can run properly in a new environment such as in a different cloud or a different namespace in a same cluster. As described in the high-level overview architecture 300, an operator is deployed in namespace 302. OSPS 304 is a success prediction service that is used to determine whether the deployment can be successful or not and provide a success rate, e.g., between 0 and 1. In this example, probability of success is 0.8. There might be some policies 306 to govern the process wherein if success criteria of probability are greater than X (wherein X is a pre-determined threshold), then deploy the operator, and if below threshold C do not deploy the operator. In this case, if 0.8 is categorized as high then the operator is deployed and if it is failed then it can be reported. Other artifacts can be retrieved from OpenShift® and other sources to determine configuration of a namespace, code, or other relevant features. The data is processed in a Kubernetes cluster 308; a Kubernetes cluster can include components that represent a control plane and a set of machines called nodes. It can also comprise containerized applications, deployment processes, and node processes. This cluster can schedule and run containers across a group of machines in the PaaS cloud. Operators that are deployed in different environments or configurations and its success vs failures data 310 can be input into an Operator Knowledge Base 316. The Operator Knowledge Base 316 can store Operator custom resource definition CRD/Code 312 and environment configurations 314 such as network policies, Role Based Access Control (RBAC), admission controllers, and resource limits. Training data 318 collected over time, can be used for active learning 320 where a new operator is deployed to a known namespace. A supervised machine-learning model is also known as similarity learning that can examine two different environment configurations and provide a similarity score between baseline environments where from prior knowledge is known that the operator will run securely and properly relative to a new environment intended for deployment.

Embodiments of machine-learning models can be trained to predict operator success. There are many algorithms such as SVM, decision trees, and neural networks that can be used to describe the model. In an accordance with embodiments, the trained machine-learning model employs similarity learning to predict success of deployment of a first operator in the environment. Similarity learning is part of supervised machine learning process wherein it classifies to measure relation of two objects. In similarity learning, data is transformed into vectors, the vectors are compared using a distance metric and the distance can be classified as similar or dissimilar. In these embodiments, an operator is deployed in an environment and the similarity learning is employed to predict success of deployment in the new environment. An example algorithm is described below:

---

Input: Previously submitted operators $o_i$ (description etc.) and their associated controller crd $r_i$ and code $c_i$ and deployed namespace features $(f_{i1}, f_{i2}, \ldots, f_{in})$ and the output $y_i$ (Success/Failure)
for each $(o_i, r_i, c_i, f_{i1}, f_{i2}, \ldots, f_{in}, y_i)$
   Use word embedding (language modeling) to map $o_i$ description to vector $v_{i1}$
   Use code embedding (language modeling) to map $c_i$ to vector $v_{i2}$
   Use code embedding (language modeling) to map $(f_{i1}, f_{i2}, \ldots, f_{in})$ to vector $v_{i3}$
   Store $v_{i1}, v_{i2}, v_{i3}$ (concatenated) as a feature vector in list X
   Store $y_i$ in Y
Train a machine learning model (SVW, Decision Trees, Neural Networks) using X as input Y as output

--- wherein there is operator $o_i$ that has a description and a code $c_i$ associated with it. Namespace has features $f_{i1}, f_{i2}, \ldots, f_{in}$ in terms of configuration. Output $y_i$ can facilitate determining success or failure of operator deployment. In similarity learning, a flag is generated if the model encounters any security issues. With use of predetermined parameters, a machine learning model can classify internal data and other security infringing activities associated with a deployment. The machine learning model can learn from different actions that are implemented on particular types of incidents to facilitate predicting fraudulent activity and identifying security risks. There are various language modeling techniques such as word embedding that can be used to map operator $o_i$, wherein a word description is provided instead of code and a numerical vector $v_{i1}$ representation is produced. Code embedding can be employed wherein given a code $c_i$, a vector is via is produced. Similarly, code embedding is mapped to namespace features and a vector via is produced. By using any suitable machine-learning model employing X as an input, an output Y is produced. A vector representation of training data can be generated to facilitate computation. In similarity learning analysis, a plurality of environments are utilized to provide operational functionality information. In this case, data from previous environments can be adopted and modeled to analyze and compare outputs to predict probability of success for an operator in a new environment. Configurations can be set to a namespace and deployed along with the operator. The output of deployment of the operator can be employed with other namespaces.

Figure 4:
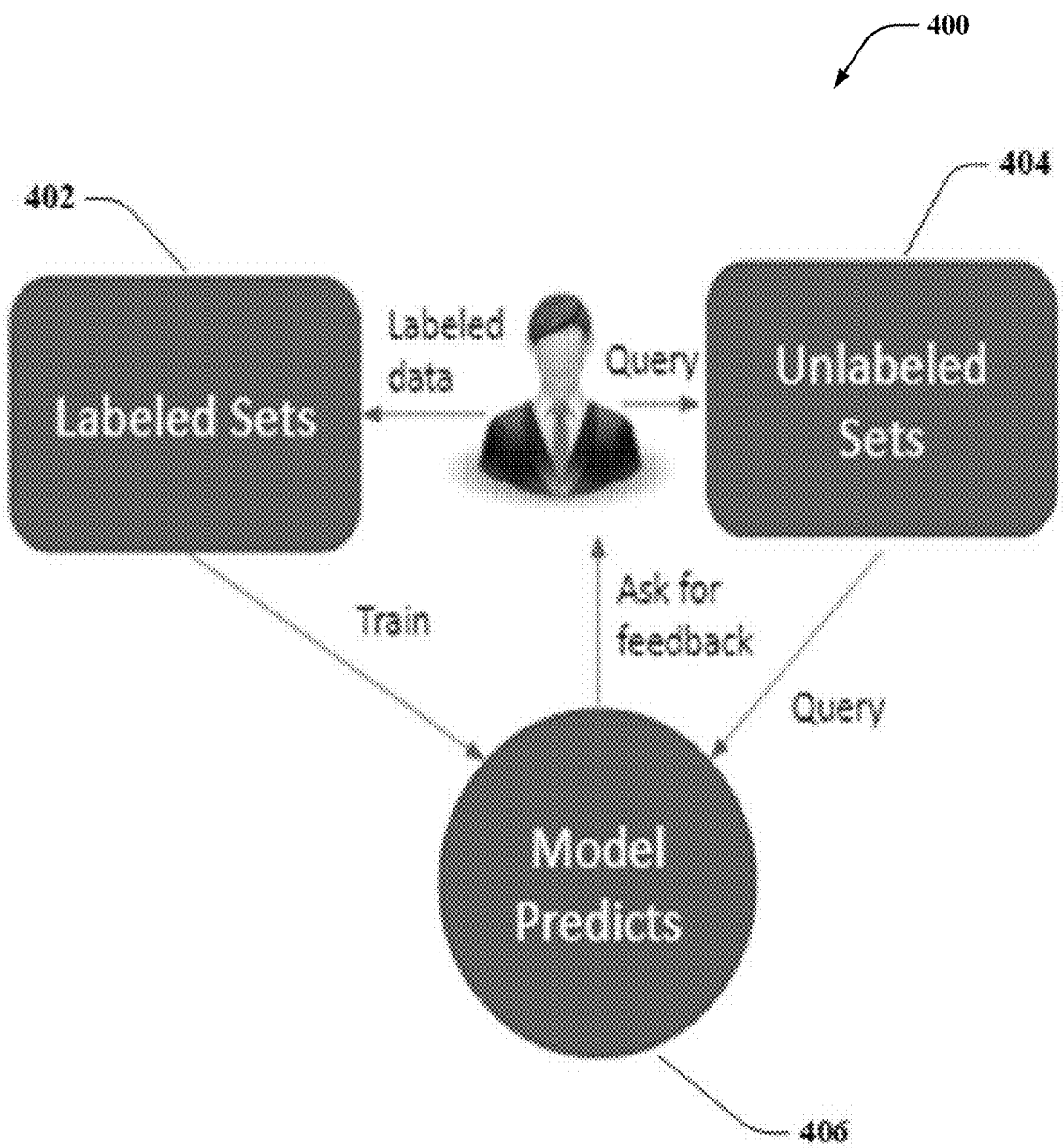
FIG. 4 illustrates an example block-level view of active learning feedback based on training data.

FIG. 4 illustrates an example block-level view of active learning feedback based on training data to train machine-learning model 108 (FIG. 1). Active learning is an algorithm in a machine-learning model wherein new data points are labeled with desired outputs. In this process 400, based on a query the process 400 prioritizes data to be labeled to have suitable impact on training a supervised model. In active learning, a large amount of data can be randomly sampled from an underlying distribution and this large dataset can be used to train the model 108 to perform a prediction, e.g., success of operator deployment in a PaaS environment. A query can be made to unlabeled sets 404 which then the model 108 utilizes to predict success or failure at 406 and can use feedback from a user to validate the prediction. Similarly, labeled set operators 402 can be in namespaces that are trained based on training data. At 406, the model 108 predicts based on the trained data success or failure and can obtain feedback from the user to validate the prediction. The training data can be updated with namespaces and labels as desired. A non-limiting example code is shown below:

---

Inputs: Labeled set $D_i$; operators, namespaces $\{m_i\}$
Train a classifier $f_1$ based on training data $D_i$
while True
   Predict a success/failure $(r_i)$ for $m_i$
   Use feedback from SME to validate that $\{r_i\}$ is correct
   Update training data $(D_i)$ with $m_i$ and its label if necessary
   Retrain a classifier $f_i$ using $D_i$

---

Whenever a new output is learned in terms of a new operator or old operator with a new namespace, this model 108 can be used. Policies can be defined based on probability; if success probability is greater than a threshold, then it is considered to be at low risk wherein actions are predefined based on risk factor. For example, policies can be defined where low risk activities can be deployed and high-risk activities cannot be deployed. Moreover, a utility-based analysis can be implemented such that benefit of accuracy of a prediction is weighed against cost of an inaccurate prediction. A system can allow predefined actions per risk prediction. In some cases when risk is low (threshold), an automation can deploy operators with higher confidence. On the other hand, when risk is high (threshold), the system can notify CI/CD experts to investigate and resolve potential risks or confirm that identified issues may not fail operators. These actions can be learned from data or active learning or adjusted as more data is collected over time.

Figure 5:
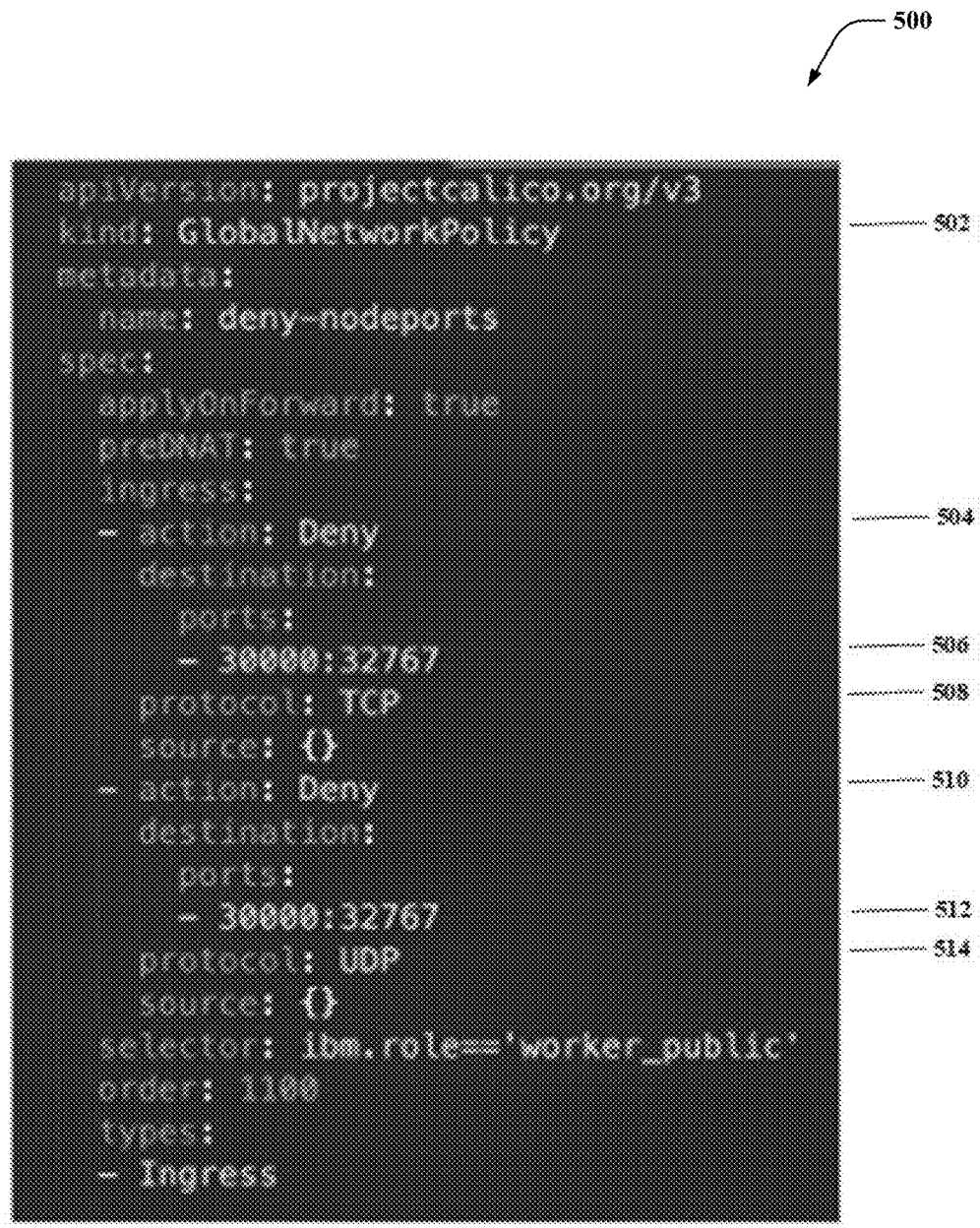
FIG. 5 illustrates an example of global network policy applied to namespaces in an environment.

FIG. 5 illustrates an example global network policy applied to namespaces in an environment. As shown in 500, electronic mail (EML) files can include information about where a network policy is going to be applied to namespaces. As described in the code, this is a global network policy 502 and it can be applied to a namespace where nodeports are denied. There are also certain particular actions 504 that can be coded where ports are denied at 506 for example ports 30000:32767 on a TCP protocol 508. Similarly, another set of actions 510 can be listed where ports range 512 from 30000:32767 on a UDP protocol 514 are denied. In this case, applications deployed within a namespace are not accepted from these ports—any operator that acts within these ports may be failed.

Figure 6:
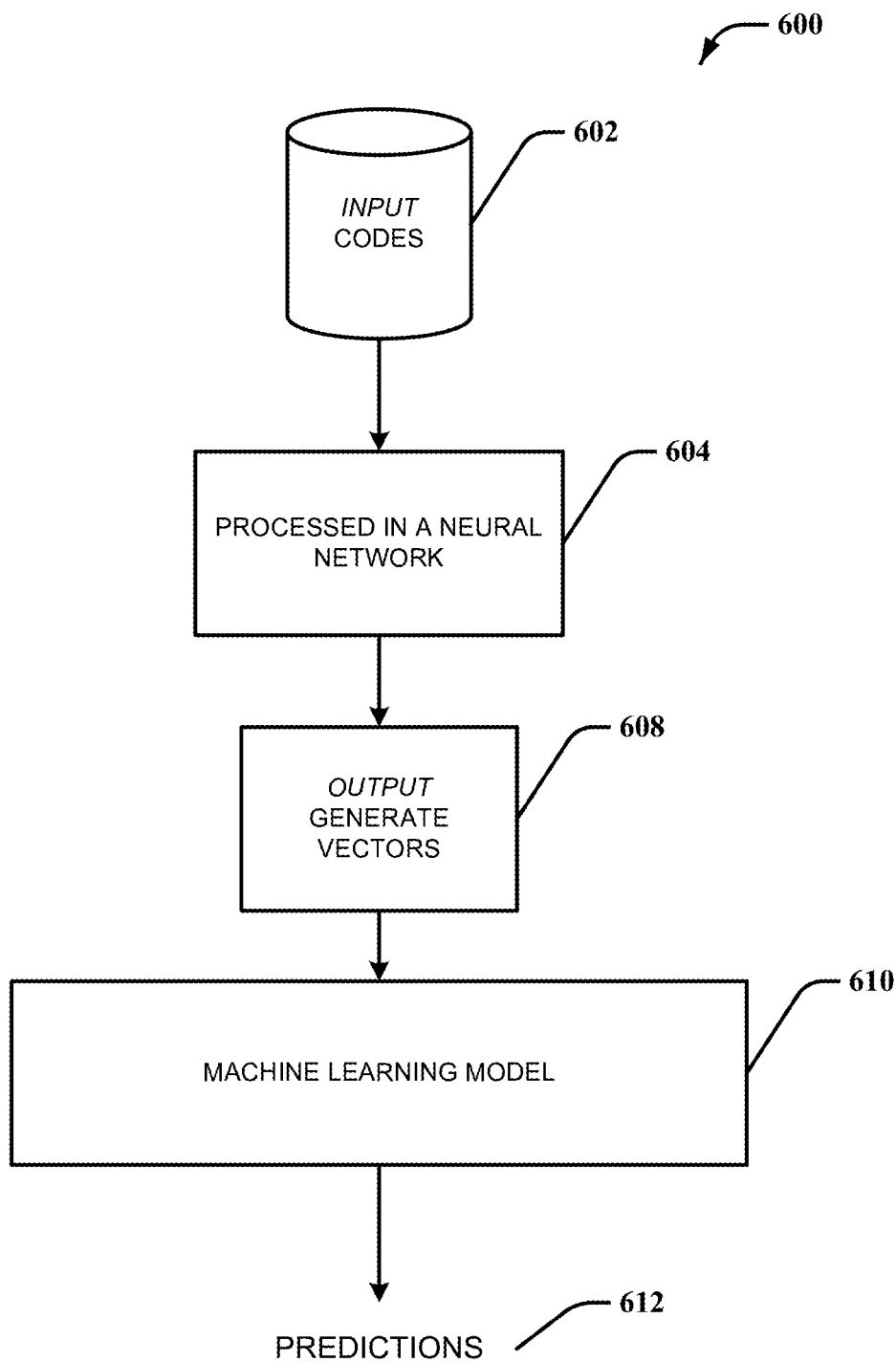
FIG. 6 illustrates an example flowchart of neural network architecture wherein code is used to generate a numerical vector.

FIG. 6 illustrates an example flowchart of neural network architecture wherein a code is used to generate a numerical vector. In a machine-learning model, code (logic) is presented in numbers. As illustrated, code is taken as an input and a numerical vector representation is generated to be used in machine-learning. This neural model represents snippets of code as continuous distributed vectors also known as code embedding. A process begins by decomposing code 602 to a collection of paths which is a fully connected layer while learning atomic representation of the path along with learning how to aggregate a set of context vectors. Code is employed and processed into a neural network 604 which generates a vector as an output 608. This is a numerical representation of the code given in the beginning. This vector representation can be used in machine-learning model 610 and generate predictions 612. Similarly, an operator code can be taken and converted to a vector as well. A code snippet or combined context vectors are represented as a single fixed-length code vector which can be used for a prediction of success of an operator deployment. Comparing previous techniques over a same data set results in a relative improvement of providing accurate prediction based on large, cross-project data. The code vectors trained on this dataset can predict method names from files that were unobserved during training and the model learns method name vectors that capture semantic similarities, combinations, and analogies. Code to vector offers a methodology to convert code to a vector to be used in machine-learning applications. Thus, a novelty resides in transforming code to a vector representation, and utilizing the vector representation to predict operator success in a new environment with different configurations written as codes.

Embodiments increase likelihood of success of operator deployment; and in case of failure, a score can serve as a troubleshooting guide starting from configuration files that are missing. Moreover, an indicator of security measures that are missing in a new environment is desirable to ensure security of other workloads around an operator in a same cluster. A test environment or previous production environments provides an example environment where the operator has functioned as intended. This information can be leveraged to perform a similarity analysis to compare the new environment with an existing one. Supervised machine-learning namely similarity learning can be used to predict success of the operator in a new environment. When the operator is predicted to likely not function properly in a new environment, the similarity analysis can provide hints as to where to start a troubleshooting process. There are many common methods for similarity and metric distance learning. In regression similarity learning, pairs of objects are given together with a measure of similarity and minimization of regulated loss. Classification similarity learning decides if a new pair of objects are similar or not. In ranking similarity learning, a relative order of similarity is provided. For example, the similarity ranking can start with objects that have most difference and proceed downwards to object(s) of least difference. Such ordering can save troubleshooting time and effort and this ranking framework facilitates scaling across relatively large applications. Moreover, if a new environment has many differences compared to a baseline environment and if it is missing security controls that are found in the baseline environment, then the similarity analysis can be used to raise a flag that the new environment may not be suitably secure.

Figure 7:
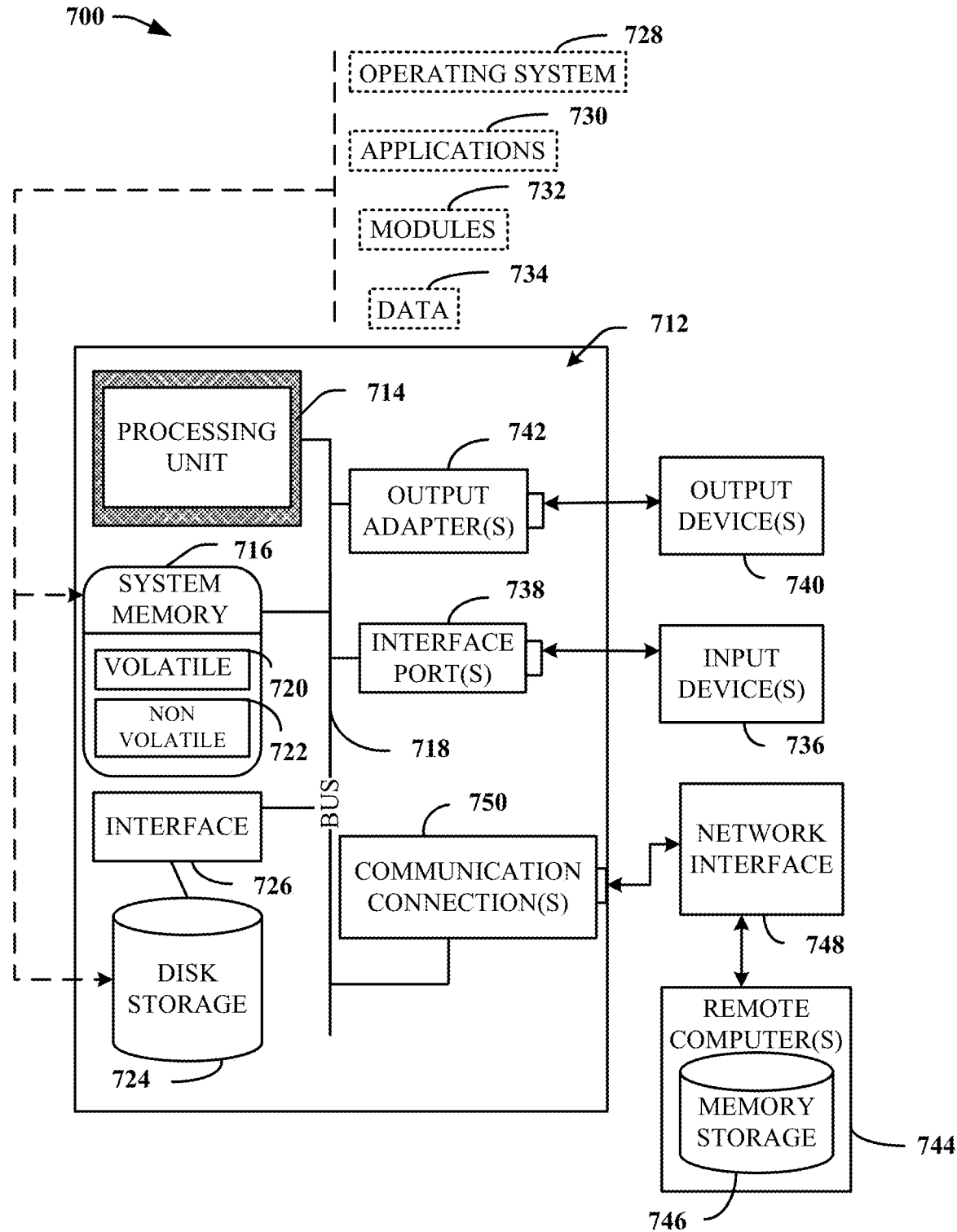
FIG. 7 illustrates a block diagram of an example, non-limiting, operating environment in which one or more embodiments described herein can be facilitated.

To provide context for the various aspects of the disclosed subject matter, FIG. 7 as well as the following discussion are intended to provide a general description of a suitable environment in which the various aspects of the disclosed subject matter can be implemented. FIG. 7 illustrates a block diagram of an example, non-limiting operating environment in which one or more embodiments described herein can be facilitated. Repetitive description of like elements employed in other embodiments described herein is omitted for sake of brevity.

With reference to FIG. 7, a suitable operating environment 700 for implementing various aspects of this disclosure can also include a computer 712. The computer 712 can also include a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714. The system bus 718 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 716 can also include volatile memory 720 and non-volatile memory 722. The basic input/output system (BIOS), containing the basic routines to transfer information between elements within the computer 712, such as during start-up, is stored in non-volatile memory 722. Computer 712 can also include removable/non-removable, volatile/non-volatile computer storage media. FIG. 7 illustrates, for example, a disk storage 724. Disk storage 724 can also include, but is not limited to, devices like a magnetic disk drive, floppy disk drive, tape drive, Jaz drive, Zip drive, LS-100 drive, flash memory card, or memory stick. The disk storage 724 also can include storage media separately or in combination with other storage media. To facilitate connection of the disk storage 724 to the system bus 718, a removable or non-removable interface is typically used, such as interface 726. FIG. 7 also depicts software that acts as an intermediary between users and the basic computer resources described in the suitable operating environment 700. Such software can also include, for example, an operating system 728. Operating system 728, which can be stored on disk storage 724, acts to control and allocate resources of the computer 712.

System applications 730 take advantage of the management of resources by operating system 728 through program modules 732 and program data 734, e.g., stored either in system memory 716 or on disk storage 724. It is to be appreciated that this disclosure can be implemented with various operating systems or combinations of operating systems. A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port can be used to provide input to computer 712, and to output information from computer 712 to an output device 740. Output adapter 742 is provided to illustrate that there are some output devices 740 like monitors, speakers, and printers, among other output devices 740, which require special adapters. The output adapters 742 include, by way of illustration and not limitation, video and sound cards that provide a means of connection between the output device 740 and the system bus 718. It is to be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a computer, a server, a router, a network PC, a workstation, a microprocessor based appliance, a peer device or other common network node and the like, and typically can also include many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 750 refers to the hardware/software employed to connect the network interface 748 to the system bus 718. While communication connection 750 is shown for illustrative clarity inside computer 712, it can also be external to computer 712. The hardware/software for connection to the network interface 748 can also include, for exemplary purposes only, internal and external technologies such as, modems including regular telephone grade modems, cable modems and DSL modems, ISDN adapters, and Ethernet cards.

Figure 8:
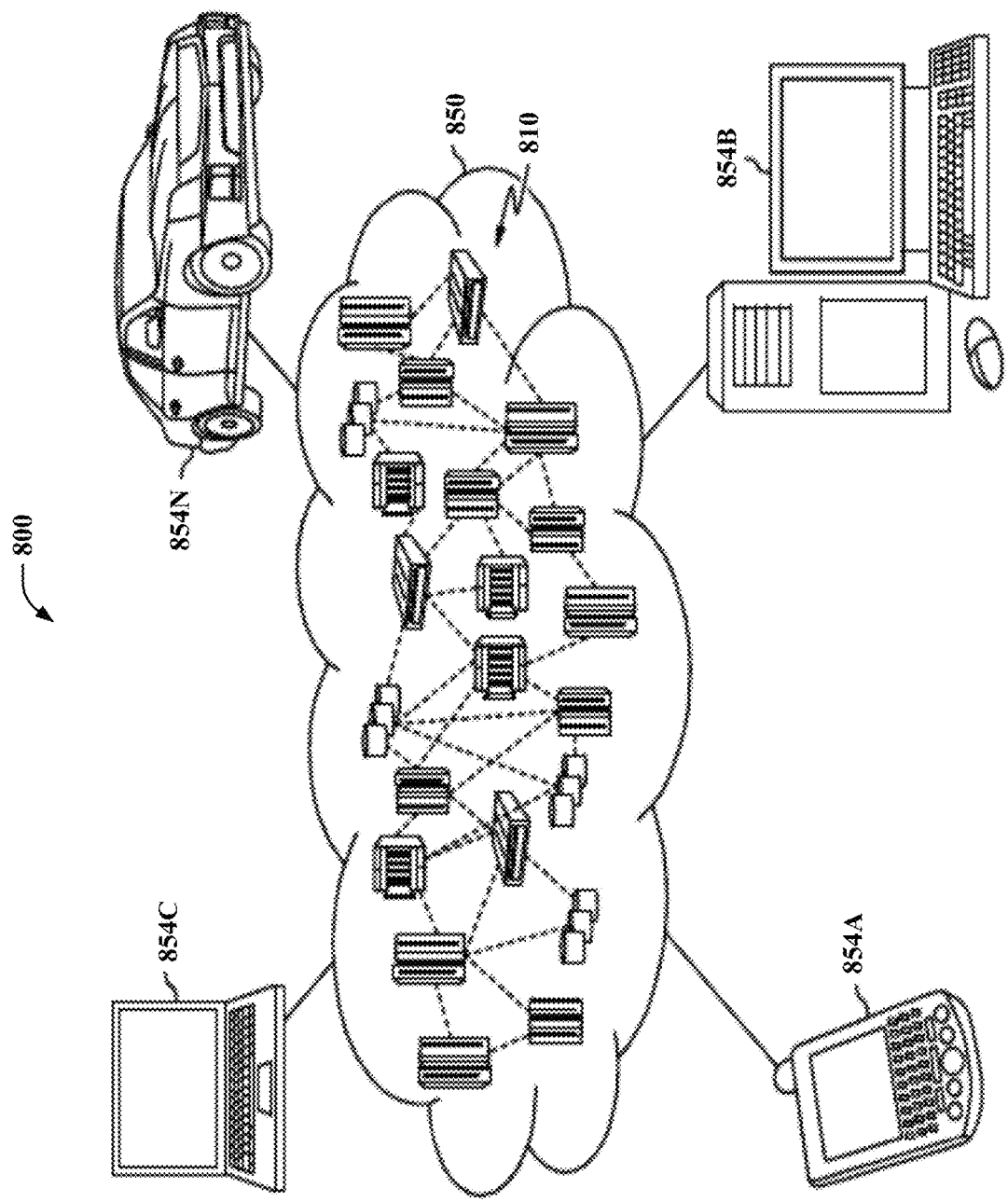
FIG. 8 illustrates a block diagram of an example, non-limiting, cloud computing environment in accordance with one or more embodiments of the subject disclosure.

Referring now to FIG. 8, an illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Although not illustrated in FIG. 8, cloud computing nodes 810 can further comprise a quantum platform (e.g., quantum computer, quantum hardware, quantum software, etc.) with which local computing devices used by cloud consumers can communicate. Nodes 810 may communicate with one another. It may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
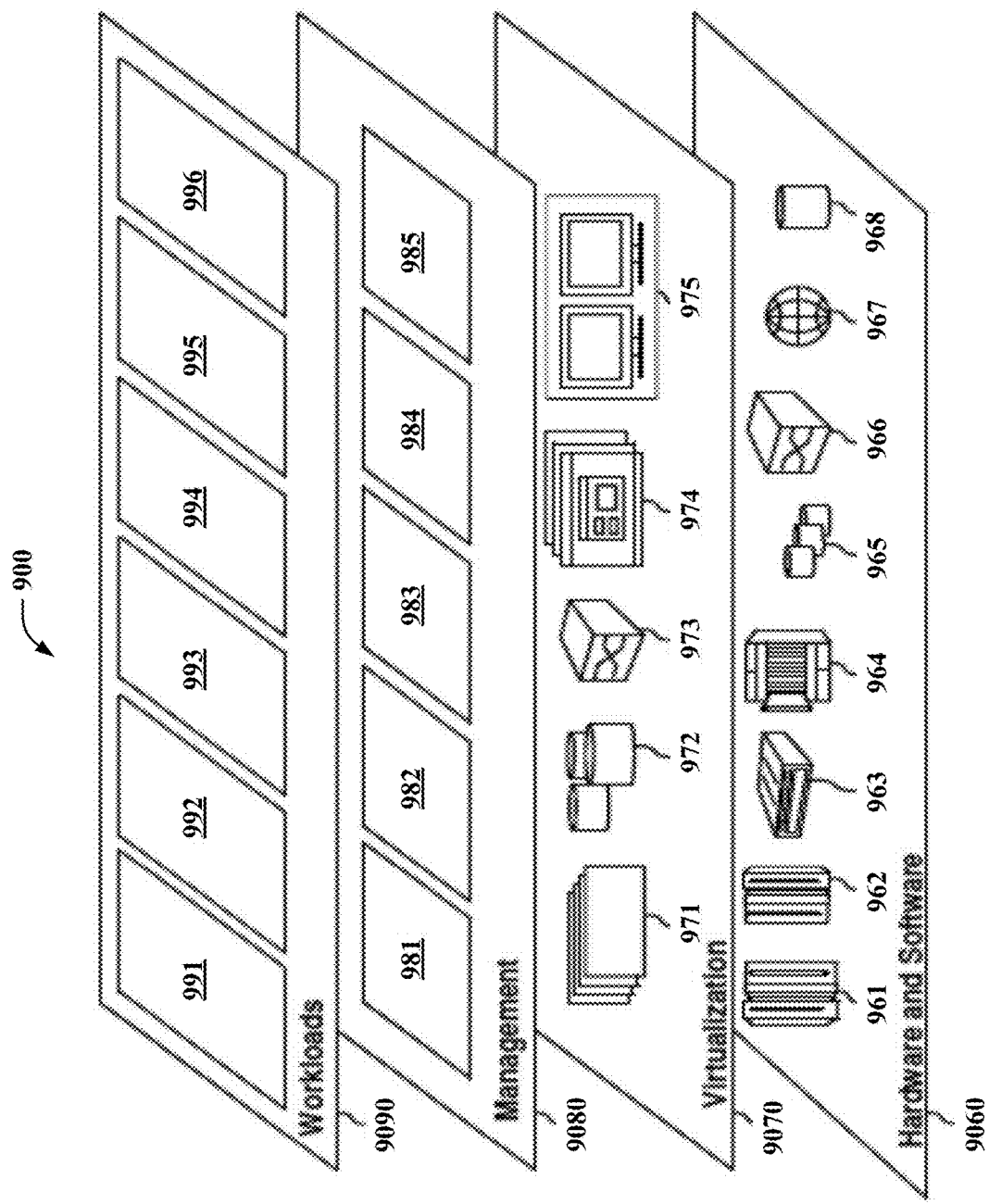
FIG. 9 illustrates a block diagram of example, non-limiting, abstraction model layers in accordance with one or more embodiments of the subject disclosure.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture-based servers 962; servers 963; blade servers 964; storage devices 965; and networks and networking components 966. In some embodiments, software components include network application server software 967, quantum platform routing software 968, and/or quantum software (not illustrated in FIG. 9).

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Non-limiting examples of workloads and functions which may be provided from this layer include: mapping and navigation 991; software development and lifecycle management 992; virtual classroom education delivery 993; data analytics processing 994; transaction processing 995; and quantum state preparation software 996.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that the block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, the block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It can also be noted that the block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art can recognize that this disclosure also can or can be implemented in combination with other program modules. Generally, program modules include routines, programs, components, data structures, etc. that perform particular tasks and/or implement particular abstract data types. Moreover, those skilled in the art can appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or non-volatile memory, or can include both volatile and non-volatile memory. By way of illustration, and not limitation, non-volatile memory can include read only memory (ROM), programmable ROM (PROM), electrically programmable ROM (EPROM), electrically erasable ROM (EEPROM), flash memory, or non-volatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise;
      a training component that trains, using training data comprising historical operators, historical environments, historical namespaces associated with historical environments, historical configurations associated with the historical namespaces, historical outcomes indicative of whether respective combinations of historical operators and features of the historical configurations were successful, a machine-learning model to:
         convert respective descriptions of the historical operators into historical description vectors,
         convert respective program code of the historical operators into historical code vectors,
         convert the features of the historical configurations into historical feature vectors,
         generate combination vectors based on the historical description vectors, the historical code vectors, the historical feature vectors, and the historical outcomes, and
         predict, based on the combination vectors, probabilities of success for deployments of operators that perform automated functions related to system management in environments with namespaces in platforms as a service cloud, wherein the namespaces have respective configurations associated with isolated entities in the environments; and
      a deployment component that:
         receives a first operator and a first namespace of a first environment of a first platform as a service cloud, and
         employs the machine-learning model to predict a probability of success of deployment of the first operator in the first namespace of the first environment.

2. The system of claim 1, wherein the first namespace has a first configuration that applies to the first namespace.

3. The system of claim 1, wherein the deployment component, in response to the probability of success exceeding a defined threshold, deploys the first operator in the first namespace of the first environment.

4. The system of claim 1, wherein the deployment component, in response to the probability of success not exceeding a defined threshold, generates a notification regarding a predicted failure of the first operator in the first namespace of the first environment.

5. The system of claim 1, wherein the machine-learning model employs similarity learning to predict the probability of success of deployment of the first operator in the first namespace of the first environment.

6. The system of claim 5, wherein the similarity learning is utilized to provide instructions regarding troubleshooting deployment of the first operator deployment in the first namespace of the first environment.

7. The system of claim 5, wherein the similarity learning is used to generate a flag regarding security issues associated with deployment of the first operator deployment in the first namespace of the first environment.

8. A computer-implemented method, comprising:
   training, by a system operatively coupled to a processor, using training data comprising historical operators, historical environments, historical namespaces associated with historical environments, historical configurations associated with the historical namespaces, historical outcomes indicative of whether respective combinations of historical operators and features of the historical configurations were successful, a machine-learning model to;
      convert respective descriptions of the historical operators into historical description vectors,
      convert respective program code of the historical operators into historical code vectors,
      convert the features of the historical configurations into historical feature vectors,
      generate combination vectors based on the historical description vectors, the historical code vectors, the historical feature vectors, and the historical outcomes, and
      predict probabilities of success for deployments of operators that perform automated functions related to system management in environments with namespaces in platforms as a service cloud, wherein the namespaces have respective configurations associated with isolated entities in the environments;
   receiving, by the system, a first operator and a first namespace of a first environment of a first platform as a service cloud; and
   predicting, by the system, using the machine-learning model, a probability of success of deployment of the first operator in the first namespace of the first environment.

9. The computer-implemented method of claim 8, wherein the first namespace has a first configuration that applies to the first namespace.

10. The computer-implemented method of claim 8, further comprising, in response to the probability of success exceeding a defined threshold, deploying, by the system, the first operator in the first namespace of the first environment.

11. The computer-implemented method of claim 8, further comprising, in response to the probability of success not exceeding a defined threshold, generating, by the system, a notification regarding a predicted failure of the first operator in the first namespace of the first environment.

12. The computer-implemented method of claim 8, further comprising employing, by the system, similarity learning to predict the probability of success of deployment of the first operator in the first namespace of the first environment.

13. The computer-implemented method of claim 12, further comprising utilizing the similarity learning to provide instructions regarding troubleshooting deployment of the first operator deployment in the first namespace of the first environment.

14. The computer-implemented method of claim 12, further comprising utilizing the similarity learning to generate a flag regarding security issues associated with deployment of the first operator deployment in the first namespace of the first environment.

15. A computer program product comprising a computer readable storage medium having program instructions embodied therewith, the program instructions executable by a processor to cause the processor to:
   train, using training data comprising historical operators, historical environments, historical namespaces associated with historical environments, historical configurations associated with the historical namespaces, historical outcomes indicative of whether respective combinations of historical operators and features of the historical configurations were successful, a machine-learning model to:
      convert respective descriptions of the historical operators into historical description vectors,
      convert respective program code of the historical operators into historical code vectors,
      convert the features of the historical configurations into historical feature vectors,
      generate combination vectors based on the historical description vectors, the historical code vectors, the historical feature vectors, and the historical outcomes, and
      predict probabilities of success for deployments of operators that perform automated functions related to system management in environments with namespaces in platforms as a service cloud, wherein the namespaces have respective configurations associated with isolated entities in the environments;
   receive a first operator and a first namespace of a first environment of a first platform as a service cloud;
   predict, using the machine-learning model, a probability of success of deployment of the first operator in the first namespace of the first environment.

16. The computer program product of claim 15, wherein the first namespace has a first configuration that applies to the first namespace.

17. The computer program product of claim 15, wherein the program instructions executable further cause the processor to:
   in response to the probability of success exceeding a defined threshold, deploy the first operator in the first namespace of the first environment.

18. The computer program product of claim 15, wherein the program instructions executable further cause the processor to:
   in response to the probability of success not exceeding a defined threshold, generate a notification regarding a predicted failure of the first operator in the first namespace of the first environment.

19. The computer program product of claim 15, wherein the program instructions executable further cause the processor to:
   employ similarity learning to predict the probability of success of deployment of the first operator in the first namespace of the first environment.

20. The computer program product of claim 19, wherein the program instructions executable further cause the processor to:
   utilize the similarity learning to provide instructions regarding troubleshooting deployment of the first operator deployment in the first namespace of the first environment.

* * * * *